Aug. 16, 1927.  1,639,192
G. KUCIPAK
AUTOMOBILE SIGNAL
Filed July 9, 1925 6 Sheets-Sheet 1
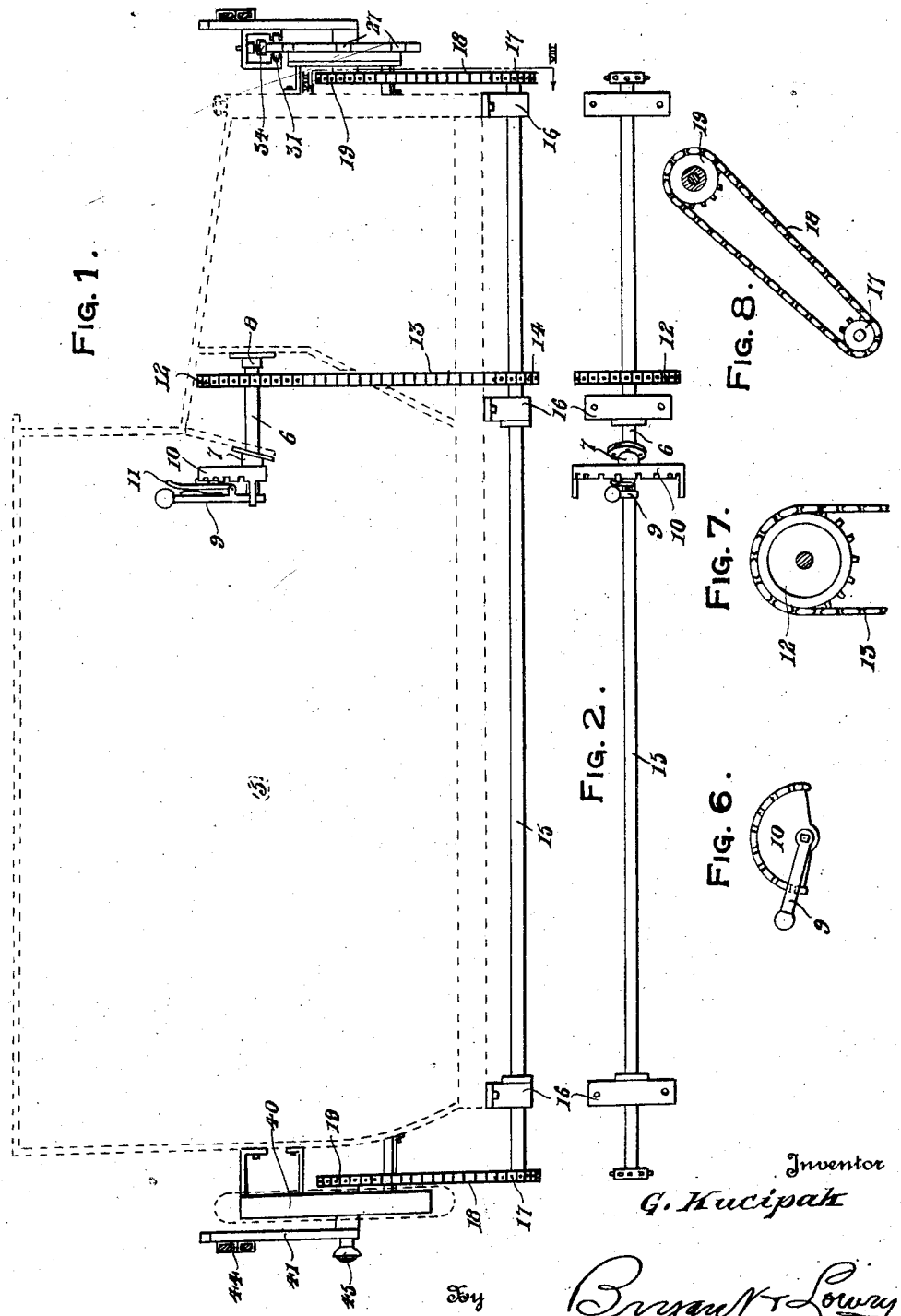

Aug. 16, 1927.
G. KUCIPAK
AUTOMOBILE SIGNAL
Filed July 9, 1925
1,639,192
6 Sheets-Sheet 2
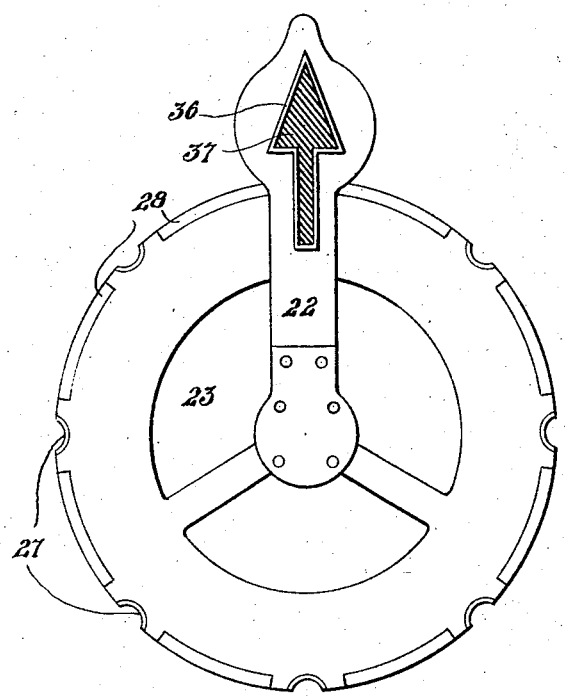
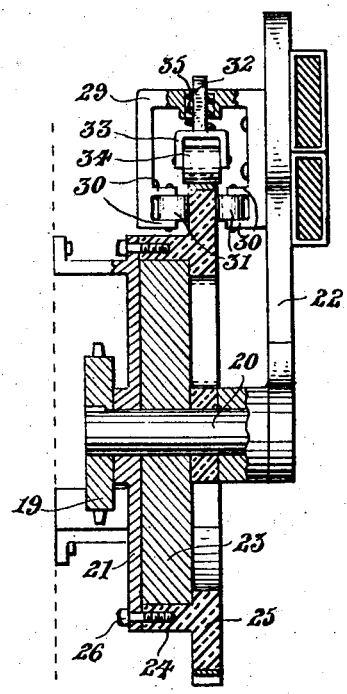
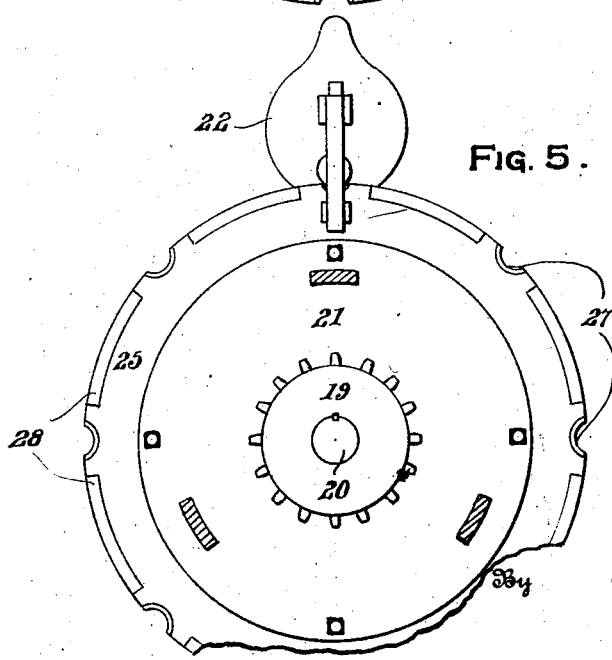

Aug. 16, 1927. 1,639,192
G. KUCIPAK
AUTOMOBILE SIGNAL
Filed July 9, 1925 6 Sheets-Sheet 3
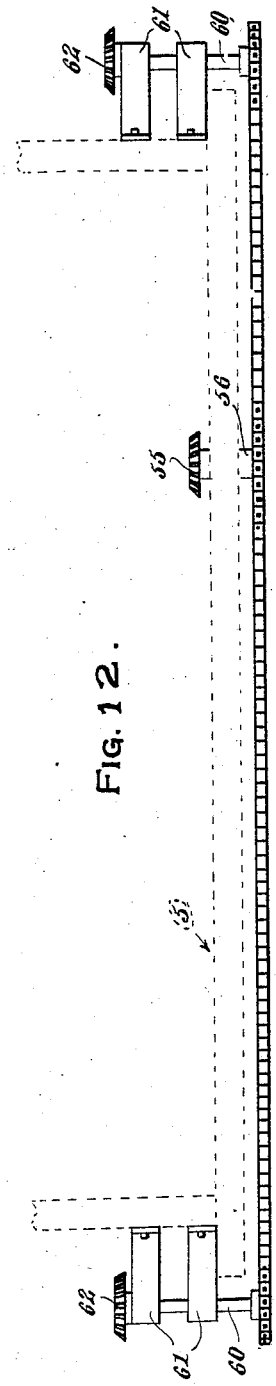
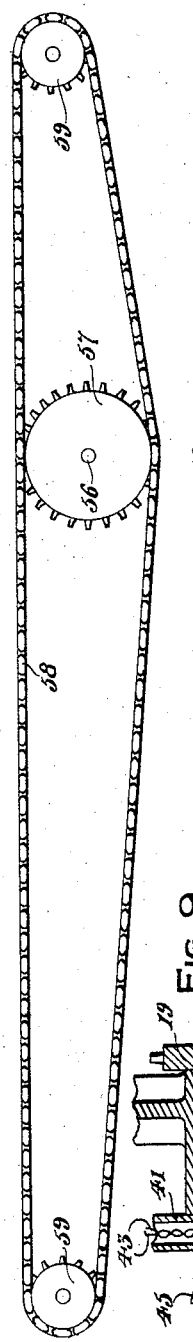
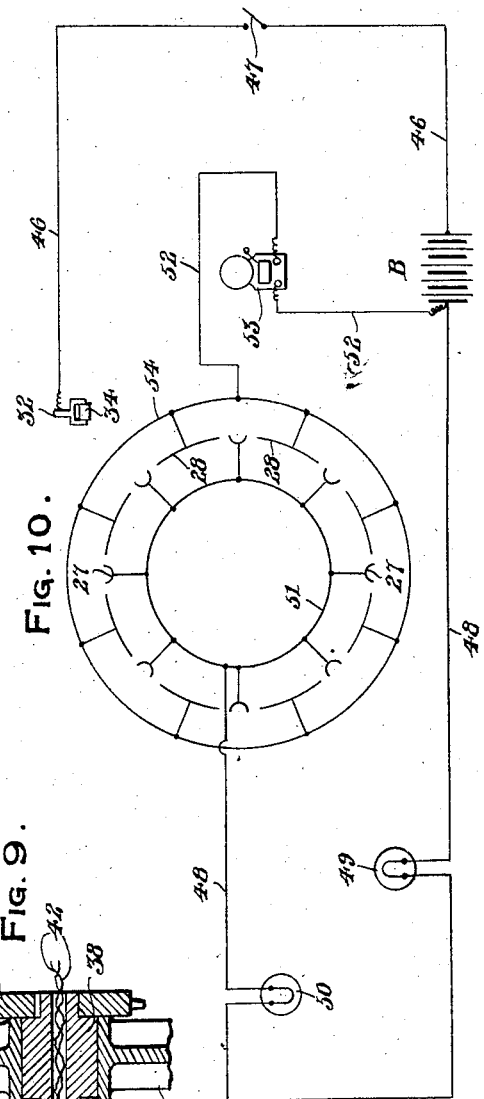

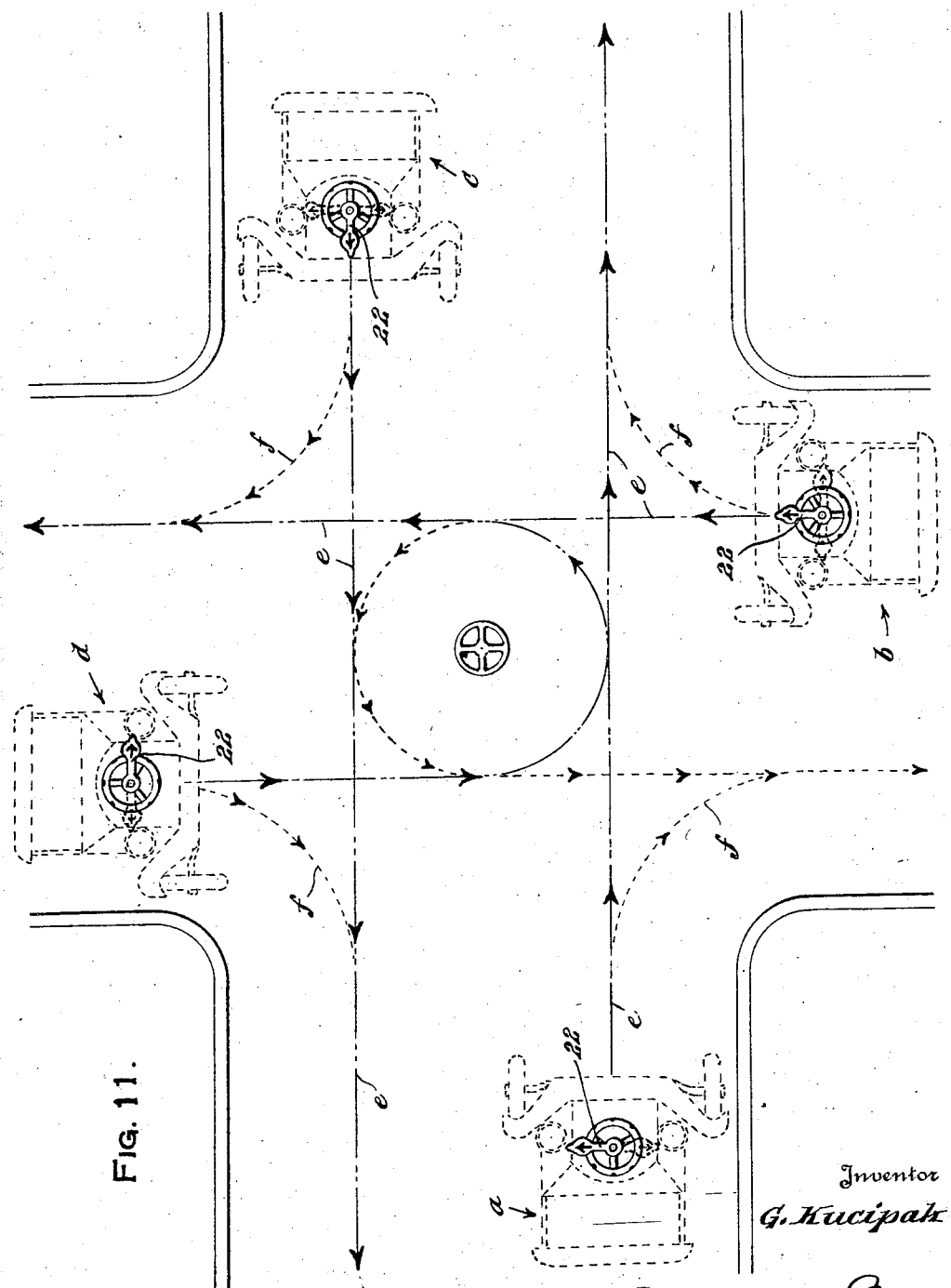

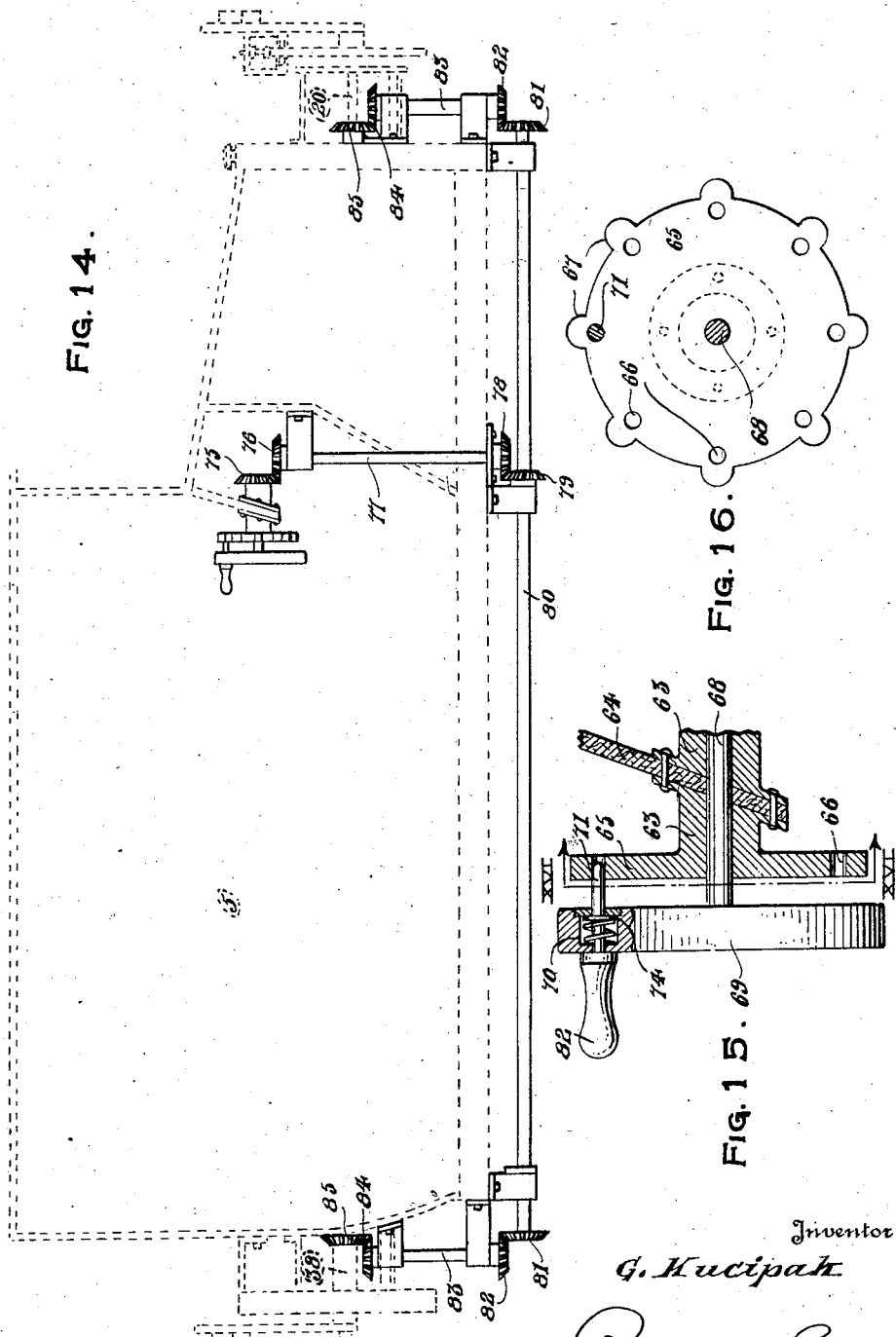

Aug. 16, 1927.
G. KUCIPAK
AUTOMOBILE SIGNAL
Filed July 9, 1925
1,639,192
6 Sheets-Sheet 6
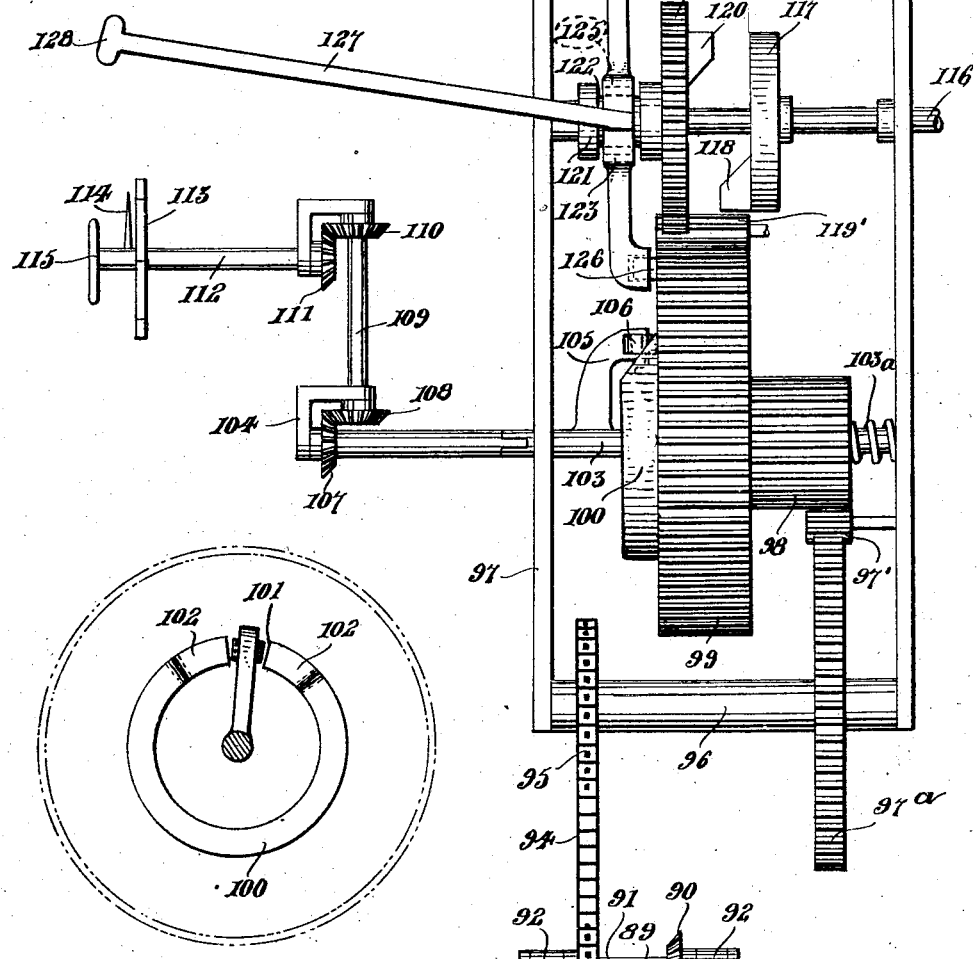
FIG. 17.
FIG. 18.
Inventor
G. Kucipak
Attorneys Patented Aug. 16, 1927.

1,639,192

UNITED STATES PATENT OFFICE.

GEORGE KUCIPAK, OF SENECA FALLS, NEW YORK.

AUTOMOBILE SIGNAL.

Application filed July 9, 1925. Serial No. 42,538.

This invention relates to new and useful improvements in automobile signals.

The primary object of this invention is to provide an automobile signal which will enable the operator of the same to indicate to pedestrians and drivers of other vehicles, located either to the front or the rear of the signalling machine, his intentions to change the speed or direction of travel.

A further object of the invention is to provide a novel form of manual control for the above referred to signal.

Other objects and advantages of the invention will be apparent during the course of the following description.

In the accompanying drawings forming a part of this specification and in which like numerals are employed to designate like parts throughout the same—

Figure 1 is a side elevational view of the automobile signal embodying this invention shown properly mounted upon an automobile body, illustrated in dotted lines, Figure 2 is a top plan view of the manual control portion of the signal, Figure 3 is a front elevational view of one of the signalling elements and a circuit controlling mechanism associated therewith, Figure 4 shows partly in side elevation and partly in vertical section the structure illustrated in Fig. 3, Figure 5 is a rear elevational view of the structure shown in Figs. 3 and 4 with a portion of the supporting bracket of the same broken away, Figure 6 is a detail elevational view of the actuating elements employed for manually controlling the signals shown in Fig. 1, Figure 7 is a fragmentary elevational view of a chain and sprocket drive from the manual actuating means to the power transmission shaft.

Figure 8 is a detail elevational view of a mechanism employed for delivering power from the transmission portion of the control to one of the signal elements, Figure 9 is a fragmentary vertical sectional view of the rear signalling element with a tail light shown associated therewith, Figure 10 is a diagrammatical view of the wiring system employed in connection with the signal shown in the aforementioned figures, Figure 11 is a schematic view showing several automobiles with signals mounted thereon and indicates a portion of the various signals which may be produced thereby, Figure 12 is a fragmentary side elevational view of a modified form of signal control, Figure 13 is a bottom plan view of the control shown in Fig. 12, Figure 14 is a side elevational view of a further modified form of control for the signal, Figure 15 shows partly in elevation and partly in vertical section the manual actuating portion of the control shown in Fig. 14, Figure 16 is a vertical sectional view taken upon line XVI—XVI of Fig. 15, Figure 17 is a further modified form of control which is shown in side elevation, this control permitting movement of the signalling element to be accomplished by connecting the same to the source of motor power of the automobile, and Figure 18 is a detail elevational view of a timing structure by means of which the connection of the signalling elements with the motor power transmission mechanism may be terminated when the signalling elements have been moved to their proper signalling position.

In the drawings, wherein for the purpose of illustration is shown a preferred embodiment of this invention, the numeral 5 designates in its entirety the automobile to which the signalling mechanism shown in Figs. 1 to 10 inclusive is attached. Suitably carried by the automobile in close proximity to the driver's seat is a rotatable shaft 6 which is journaled in the bearings 7 and 8 and has fastened on one end thereof an operating handle 9. The bearing 7 carries a quadrant 10 having teeth formed therein which cooperate with the spring latch 11 carried by the handle 9 and by means of which the said handle may be held in any of its adjusted positions.

The shaft 6 has mounted thereon a sprocket wheel 12 carrying a sprocket chain 13 which extends to and rides upon a sprocket wheel 14 carried by the rotatable, power transmission shaft 15 which extends longitudinally of the automobile 5 and is fastened to the underneath portion of the same by the bearings 15. Each end of this shaft 15 has mounted thereon a sprocket wheel 17 upon which rides a sprocket chain 18 which extends to a sprocket wheel 19, as best illustrated in Figs. 1 and 8.

In Figs. 3 to 5 inclusive the front sprocket wheel 19 is illustrated as being keyed to a stub shaft 20 which is journaled in a bracket bearing 21 and has mounted upon its outer end an arrow-shaped signalling arm or element 22 which is intended to move through a circular path. Fastened to this bracket 21 is a disk 23 which has encircling the same the annular ring or flange 24 of an insulating wheel-like member 25 which is secured to the bracket by the screws 26.

This wheel-like insulating element 25 has embedded in its periphery eight equi-spaced, semi-cylindrical contacts 27. Embedded in the periphery of the element 25 and interposed between these contact elements 27 are eight equi-spaced contact strips 28 which terminate at their ends in spaced relation to the adjacent ends of the contacts 27.

In Figs. 4 and 5 the inner face of the signalling arrow or elements 22 is shown as having fastened thereto a substantially inverted U-shaped bracket 29 which has the lugs 30 formed on the ends thereof and opening inwardly toward each other. Journaled between these lugs 30 are a pair of rollers 31 which are intended to engage and ride upon the opposite faces of the wheel-like element 25, out of contact or engagement with the contacts 27 and 28, for insuring against wabbling or untrue traveling of the signalling element 22. The top part of the inverted U-shaped bracket 29 has projecting therethrough the stem 32 which carries the yoke 33 at its lower end having the contact roller 34 journaled therein. A spring 35 surrounds the stem 32 and bears at its opposite ends against the bracket 29 and the yoke 33 for functioning to retain the contact roller 34 in engagement with the periphery of the wheel-like element 25 and the outer surfaces of the contacts 27 and 28 when registering therewith.

This signalling element or arm 22 has a lamp casing 36 mounted on the front face thereof which is of substantially arrow formation and has the green lenses or panes of glass 37 mounted therein.

In Figs. 1 and 9, the rear sprocket wheel 19 is illustrated as being keyed to the shaft 38 which is journaled in a bearing 39 formed in the spare tire carrier 40. This shaft 38 has keyed thereto the rear signalling element or arm 41 which is of substantially arrow-like formation as described in connection with the signalling element arm 22 shown in Figs. 3 and 4. The shaft 38 is of tubular formation for permitting the electric supply wires for the two to extend therethrough, while the signalling element or arm 41 is also hollowed out for permitting the passage therethrough of the wires 43 which lead to the lamp casing 44 shown in Fig. 1 as being mounted upon the signalling element or arm 41. The outer end of the shaft 38 has mounted thereon the tail light 45 which is supplied with electricity by the wires 42.

In Fig. 10 there is shown the wiring system for the signal shown in Figs. 1 to 9 inclusive. This system includes the battery B which has the wire 46 extending from one terminal thereof to the stem 32 of the contact roller 34, the said wire 46 having the manual circuit making and breaking switch 47 interposed therein. The remaining terminal of the battery B has connected thereto a wire 48 which has connected in series therein the bulbs 49 and 50 which it is to be understood are mounted within the lamp casings 36 and 44 carried by the signalling elements or arms 22 and 41 respectively. The opposite end of this wire 48 is connected to a common wire 51 which is connected to each one of the equi-spaced semi-cylindrical contacts 27 carried by the wheel-like element 25. This last mentioned terminal of the battery B has connected thereto a second wire 52 which has an audible signal, such as the bell 53 connected in series therein, as illustrated. The remaining end of this wire 52 is connected to the wire 54 which is common to and connected with all of the contact strips 28 carried by the wheel-like element 25.

The operation of the mechanism so far described may be explained as follows:—

It is to be understood that the bulbs 49 and 50 in the signalling elements or arms 22 and 41 will be illuminated every time the contact roller 34 engages and is seated in one of the semi-cylindrical contacts 27. It will be apparent from this fact that eight independent signals may be produced. It is believed unnecessary to attempt to enumerate the eight different signals that may be produced, therefore, only a few of the same will be referred to. In Figs. 1 and 3 to 5 inclusive the signalling elements or arms are shown as being arranged in truly vertically extending positions with the contact roller 34 seated in the semi-cylindrical contact 27 located at the uppermost point of the wheel-like element 25. The elements or arms 22 and 41 are intended to indicate the intention of the driver of the vehicle to steer his machine straight ahead at a standard rate of speed. The bulbs 49 and 50, if the machine is traveling at night, are illuminated for displaying the location of the signalling elements or arms. These lamps 49 and 50 may be dispensed with during daylight hours by the opening of the switch 47.

If the driver intends to change the direction of travel of his vehicle by steering the same to the right, he actuates the handle 9 until the latch 11 is received within the proper notch in the quadrant 10. This movement of the handle 9 has caused the signalling elements or arms 22 and 41 to be moved one-quarter of a circle or until they are pointing truly laterally toward the right of the vehicle. It will be noted, that when the switch 47 is closed, this movement of the signalling element or arm 22 will have caused the audible signal 53 to be energized immediately after the signalling element or arm 22 has started to move, due to the fact that the contact roller 34 has been placed in engagement with the contact strip 28 arranged to the right of the upper contact 27. The roller 34, however, continues to travel around the periphery of the wheel like element 25 and during its travel until the signalling element or arm 22 arrives at its right hand turn signalling position, it has been placed in engagement with another of the contacts 27 and a second contact strip 28. This movement of the signalling arm 22, therefore, causes the lamps 49 to flash on and off once and the audible signal 53 to be sounded twice prior to the time the signalling elements or arms arrive at their intended, right hand signalling positions. The sounding of the audible signal 53 is intended to attract attention to the automobile equipped with this signal for warning pedestrians and drivers of other vehicles that the driver of the signalling vehicle intends to make some change in the control of his vehicle.

In Fig. 11 four different automobiles, which will be designated by the reference numerals —a—, —b—, —c— and —d— are shown approaching an intersection from four different blocks. These different automobiles are all equipped with the signalling apparatus previously described and the various positions of the signalling element or arm 22 at the front of the same is intended to illustrate different direction changing signals, the travel of the various automobiles being illustrated by the dot and dash arrow lines —e— and the dot arrow lines —f—.

In Figs 12 and 13 there is illustrated a modified form of power transmission mechanism for actuating the signalling elements 22 and 41, previously referred to. It is to be understood that the handle 9 and its operated shaft 6 are to be employed with this transmission mechanism and that the shaft 6 has a bevel gear, not shown, mounted thereon which is intended to drive a vertical shaft having beveled gears at its opposite ends, not shown. This vertical shaft is intended to have its lower bevel gear meshing with the bevel gear 55 which is carried by a shaft 56 having mounted on its lower end the sprocket wheel 57. This sprocket wheel 57 has riding thereon the sprocket chain 58 which extends in opposite directions for riding around the sprocket wheels 59 carried by the vertical shafts 60 journaled at the opposite ends of the automobile 5. These shafts 60 are journaled in the bearings 61 and have the bevel geers 62 mounted upon their upper ends. It is intended that these bevel gears 62 be connected by any suitable shafts and gears to the signalling elements or arms 22 and 41 so that the latter may be actuated in the same manner as described in connection with the system shown in Fig. 1.

In Figs. 14 to 16, there is shown a further modified form of control for the signalling elements or arms 22 and 41. This signalling control includes the bearings 63 fastened to the instrument board 64 of the automobile 5, as best illustrated in Figs. 14 and 15. The bearing 63 arranged on the inner side of the instrument board 64, i. e. the side toward the driver's seat, not shown, has formed on its free end the disk 65 which has the eight, equi-spaced apertures 66 extending transversely therethrough adjacent its periphery. The knobs 67 project radially from the periphery of the disk 65 and are arranged in radial alinement with the apertures 66 for indicating the locations of the same. The shaft 68 is journaled in these bearings 63 and has mounted on one end thereof the wheel 69 which is provided with a socket 70 through which projects the slidable pin 71 carried by the handle 72. Positioned within this socket 70 and encircling the pin 71 is a spring 73 which bears against the washer 74 fastened to the pin 71. It will now be seen that by moving the handle 71, by an axial outward pull, to remove the free end of the pin 71 from an aperture 66, the wheel 69 and shaft 68 may be rotated any portion of a circle and the handle 72 released for permitting the spring 73 to cause the pin 71 to enter the aperture 66 registering therewith.

This rotation of the shaft 68 will cause the bevel gear 75, shown in Fig. 14 as being fastened thereto, to rotate. This bevel gear 75 meshes with a bevel gear 76 carried by the vertical shaft 77. This vertical shaft extends through the bottom of the automobile 5 and has mounted upon its lower end the bevel gear 78 which meshes with the bevel gear 79 carried by the transmission shaft 80 which extends longitudinally of the said automobile. The opposite ends of this shaft 80 have mounted thereon the bevel gears 81 which mesh with the bevel gears 82 carried by the perpendicular shafts 83 arranged at the front and rear ends of the automobile. These shafts 83 have mounted upon their upper ends the bevel gears 84 which mesh with the bevel gears 85 carried by the signal element supporting shafts 20 and 38, see Figs. 4 and 9.

In Figs. 17 and 18 there is shown another modified form of control for the signalling elements. In this form the shaft 15ª is intended to be the same as the shaft 15 in Fig. 1 and to have connected to its opposite ends the sprocket wheels 17 which actuate the sprocket chains 18 forming connections with the said signaling elements 22 and 41. This shaft 15ª has keyed thereto a bevel gear 86 which meshes with a bevel gear 87 carried by the shaft 88. The upper end of this shaft has mounted thereon a bevel gear 89 which meshes with a bevel gear 90 carried by the horizontal shaft 91. This horizontal shaft is suitably supported by the bearings 92 and has mounted thereon a sprocket wheel 93 engaged by the sprocket chain 94 which rides upon the sprocket wheel 95 carried by the shaft 96 journaled in the box or frame 97. This shaft 96 has fastened thereto the gear 97ª which is connected by the idle-gear 97′ with the pinion 98 formed integrally with the gear 99 which has formed on its opposite side a concentric track surface 100 which is formed with the cutaway portion or notch 101 having the sloping surfaces 102 leading to the base thereof. It is to be understood that the pinion 98, gear 99, and track surface 100 are all loose on the shaft 103 which is journaled in the element 97.

This shaft 103 is prevented from moving longitudinally by the angle bracket 104 in which the outer end of the same is journaled. This shaft is further provided with the arm 105 which has the roller 106 journaled in its bent end, the roller 106 being arranged to engage and travel on the track surface 100. The end of the shaft 103 journaled in the angle bracket 104 is provided with a bevel gear 107 meshing with a bevel gear 108 carried by the perpendicular shaft 109. The upper end of this shaft is provided with a bevel gear 110 which meshes with a bevel gear 111 carried by the shaft 112. This shaft is journaled in a dial member 113 and has the pointer 114 projecting therefrom and cooperating with the dial 113. The shaft 112 is further provided with an operating handle 115 by means of which the same may be rotated.

The frame 97 has journaled therein a power shaft 116 which is intended to be constantly driven by means of any suitable form of connection with the motive power unit of the automobile. This shaft 116 has fastened thereto the disk 117 having the lateral lug 118 carried thereby. Loosely mounted upon this shaft 116 is a gear 119 having the lug 120 projecting from one side thereof in the direction of the disk 117 and concentric with the lug 118 carried by the latter. This gear 119 is intended to be connected by the idle-gear 119′ the gear 99 carried by the shaft 103.

The gear 119 is carried by the hub 121 which is loose on the shaft 116 and has the groove 122 formed therein. Encircling this groove is the elongated portion 123 of the pivoted lever 124 which has an elongated slot 125 for receiving the grooved portion 122 of the hub 121. The lower end of this lever 124 is provided with a roller 126 which is properly located for engaging one side of the gear 99. Fastened to this lever 124 is a rod 127 having the hand engaging portion 128 formed at its free end.

The operation of this control mechanism may be described as follows:—

It is to be understood that the signal elements 22 and 41 are arranged in their truly vertically extending positions, as shown in Fig. 1. If the driver of the vehicle desires to indicate a right hand turn, he must move the signalling elements 22 and 41 toward the right until they are pointing truly laterally or in a horizontal position to the right of the vehicle. To bring about this movement of the signalling element, the driver grasps the handle 115 and moves the shaft 112 until the pointer 114 registers with the proper designating number, or the like on the dial 113 which should be one-quarter of the way around the dial 113 from the vertical position shown in Fig. 17. This movement of the shaft 112 will cause the shaft 103 to be turned in a clockwise direction for arranging the arm 105 in a horizontal position extending to the right of the shaft 103. This movement of the arm 105 has caused the roller 106 to travel along the inclined surface 102 of the track and onto the track surface 100. This travel of the roller 106 will cause the track 100, the gear 99, and the pinion 98 to move longitudinally of the shaft 103 against the tension of the spring 103ª.

It is to be understood that the gear 99 and pinion 98, so far, have not been rotated and the signal elements 22 and 41 are still pointed truly vertically as shown in Fig. 1. The operator of the vehicle should then cause the rod 127 to move longitudinally for shifting the gear 119 laterally of the gear 99 and longitudinally of the power shaft 116 until the lug 120 is placed in the path of travel of the lug 118. This moving lug 118 will then engage the lug 120 and cause the gear 119 to rotate in a clockwise direction when viewed from the driver's seat, this clockwise movement is due to the power shaft 116 rotating in that direction. This movement of the gear 119 in a clockwise direction will cause the gear 99 to move, due to the idle-gear 119′ in a clockwise direction about the shaft 103. Due to the pinion 98 being connected to the gear 99, the gear 97ª will also rotate and the connection between its supporting shaft 96 and the power transmission shaft 15ª will cause the signalling elements 22 and 41 to move toward the right of the vehicle. This movement of the signalling element will continue until the gear 99 has traveled, with its track 100 to bring the notch 101 in alinement with the roller 106 carried by the arm 105. The spring 103ª will then force the pinion and gear structure longitudinally of the shaft 103 toward the roller 106. This movement of the gear 99 will cause the same to engage the roller 126 carried by the lever 124 and will pivot this lever for moving the gear 119 longitudinally of the power shaft 116. This longitudinal movement of the gear 119 will disengage the lug 120 from the lug 118 and will thereby stop the operation of the signal element moving mechanism.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:—

1. In a device of the class described, the combination with an automobile, of a pivoted signal element at each end of said automobile, power transmission means extending longitudinally of the automobile, a connection between each signal element and its respective end of said transmission means, a shaft constantly driven by the motor power plant of the automobile, slide gears and clutch devices for selectively connecting the power transmission means with said driven shaft, and a cam ring and control arm adapted to be set by the driver for automatically breaking the last mentioned connection when the signal elements have been moved to the proper signalling positions.

2. In a device of the class described, the combination wth an automobile, of a pivoted signal element at each end of said automobile, power transmission means extending longitudinally of the automobile, a connection between each signal element and its respective end of said transmission means, a shaft constantly driven by the motor power plant of the automobile, a train of mechanical elements constantly connected to the power transmission means, a clutch structure for connecting and disconnecting said train of elements with said driven shaft manually operable means for rendering the clutch structure operative and a manually operable control arm associated with the mechanical element for effecting release of the clutch structure.

3. In a device of the class described, the combination with an automobile, of a pivoted signal element at each end of said automobile, power transmission means extending longitudinally of the automobile, a connection between each signal element and its respective end of said transmission means, a shaft constantly driven by the motor power plant of the automobile, a train of mechanical elements constantly connected to the power transmission means, a clutch structure for connecting and disconnecting said train of elements with said driven shaft manually operable means for rendering the clutch structure operative and a manually operable control arm associated with the mechanical element for effecting release of the clutch structure and said mechanical element including a cam track with which the control arm is associated.

4. In a device of the class described, the combination with an automobile, of a pivoted signal element at each end of said automobile, power transmission means extending longitudinally of the automobile, a connection between each signal element and its respective end of said transmission means, a shaft constantly driven by the motor power plant of the automobile, a train of gearing constantly connected to the power transmission means, a clutch structure for connecting and disconnecting said gear train with said driven shaft, a circular cam track carried by one of said gears and an arm cooperating with the cam track adapted to be set by the driver for automatically disengaging the elements of said clutch structure when the signal elements have been moved to the proper signalling positions.

5. In a device of the class described, the combination with an automobile, of a signal element at each end of said automobile, power transmission means extending longitudinally of the automobile and connected to the signal elements, a shaft constantly driven by the motor power plant of the automobile, a train of gearing interposed between the transmission means and driven shaft, a clutch connection between one of said gears and driven shaft, a cam device carried by another gear and a manually movable arm cooperating with the cam device whereby the gear train is disconnected from the driven shaft when the signal elements have been moved to proper positions.

In testimony whereof I affix my signature.

GEORGE KUCIPAK.